Patented Aug. 15, 1933

1,922,978

UNITED STATES PATENT OFFICE 1,922,978

PROCESS OF PRODUCING VAT DYESTUFF PRINTS AND CLOSELY ADJACENT THERETO ANILINE BLACK PRINTS ON THE SAME FABRIC

Ernst Pfeffer, Frankfort-on-the-Main-Schwanheim, Germany, assignor to General Aniline Works, Inc., New York, N. Y., a Corporation of Delaware No Drawing. Application May 7, 1929, Serial No. 361,260, and in Germany May 16, 1928

4 Claims. (Cl. 8—5)

The present invention relates to a process of producing vat dyestuff prints and closely adjacent thereto aniline black prints on the same fabric.

In practice it is difficult to produce vat dyestuff prints and closely adjacent thereto aniline black prints on the same fabric because, for printing purposes, the aniline black preparation is used in an acid state and the vat dyestuff preparation in an alkaline state and these two different printing colors detrimentally affect one another when applied to the fabric in designs which either overlap or run closely adjacent to each other. Moreover, in order to fix the vat dyestuff, it is necessary to steam the material for 5 minutes in a steam ager (Mather-Platt). In consequence of this steaming operation which lasts too long for a normal aniline black printing process, the vegetable fiber is considerably weakened by the acid constituents of the aniline black printing preparation.

Now I have found that it is possible to produce vat dyestuff prints and closely adjacent thereto aniline black prints on the same fabric by proceeding in the following manner: The material is printed in separate designs with a printing paste comprising an aniline black preparation and with another printing paste comprising a vat dyestuff and a thickening agent capable of being precipitated by an alkali, such as cellulose esters or cellulose ethers which are soluble in cold water or mucilaginous substances, for instance carrageen, or a mixture of such thickening agents as are capable of being precipitated by an alkali with known thickening agents, such as starch or flour, the vat dyestuff printing paste, however, containing no alkali and no reducing agent. The printed material is then steamed for a short time or exposed to air in order to oxidize the aniline black color. The material is further treated with a reducing solution, for instance an alkaline hydrosulfite solution in order to fix the vat dyestuff, and finally steamed for a short time without previous drying. The vat dyestuffs thus applied along with the aniline black can be printed in a neutral or weakly acidified state and, therefore, do no longer detrimentally affect the aniline black printing colors; on the other hand the aniline black after being developed is not influenced by the operation of fixing the vat dyestuff which requires only a short steaming.

Furthermore, it is possible by my new process to print the material with a mixture of a vat dyestuff and aniline black or another dyestuff which can be produced on the fiber by oxidation. Thus the tints of aniline black can be varied.

The following examples illustrate my invention:

The constituents are composed as follows:

Example 1

| Printing color for vat dyestuffs | Printing color for aniline black |
|---|---|
| 100 g. of the yellow vat dyestuff prepared according to U.S. Patent No. 1,564,584 of December 8, 1925<br>300 g. of water<br>600 g. of thickening M | 84 g. of aniline salt<br>5 g. of aniline oil<br>600 g. of thickening M<br>25 g. of sodium chlorate<br>50 g. of yellow potassium ferrocyanide<br>236 g. of water |
| 1000 g. | 1000 g. |

Thickening M:
  75 grams of dry methyl cellulose are added to
  925 grams of hot water 1000 grams The methyl cellulose dissolves in water when the mixture cools down.

The two printing colors are applied to the material in separate designs and the material is then steamed for 1 minute in the Mather-Platt at 95° C. and subsequently padded in the following solution for the purpose of fixing the vat dyestuff:
100 g. of hydrosulfite concentrated powder
747 g. of cold water
150 ccm. of caustic soda solution of 40° Bé.
  3 g. of a wetting agent
—
  1 liter The next following operations consist in steaming the material, without drying it, in a roller box for about 15 seconds at about 95° C. to 98° C., rinsing, weakly acidifying, again rinsing and soaping at boiling temperature.

Example 2

The constituents are composed as follows:

| Printing color for vat dyestuffs | Printing color for aniline black |
|---|---|
| 100 g. of the yellow vat dyestuff prepared according to U.S. Patent No. 1,564,584 of December 8, 1925<br>300 g. of water<br>600 g. of carrageen thickening | 84 g. of aniline black<br>5 g. of aniline oil<br>600 g. of carrageen thickening<br>25 g. of sodium chlorate<br>50 g. of yellow potassium ferrocyanide<br>236 g. of water |
| 1000 g. | 1000 g. |

Carrageen thickening:
  50 g. of carrageen are thoroughly boiled with 950 g. of water for 4 hours while replenishing the evaporated water and the whole is made up to 1000 g.

The printing colors are applied to the material and the printed material is treated as indicated in Example 1.

I claim:

1. The process of producing vat dyestuff prints and closely adjacent thereto aniline black prints on the same fabric, which comprises printing the material in separate designs with a printing paste comprising an aniline black preparation, and with another printing paste comprising a vat dyestuff and a thickening agent capable of being precipitated by an alkali, but containing no alkali and no reducing agent, then developing the aniline black, by shortly steaming the material, and thereupon fixing the vat dyestuff by treating the material in an alkaline bath containing a reducing agent, and subsequently steaming the material thus treated.

2. The process of producing vat dyestuff prints and closely adjacent thereto aniline black prints on the same fabric, which comprises printing the material in separate designs with a printing paste comprising an aniline black preparation, and with another printing paste comprising a vat dyestuff and as a thickening agent an organo-oxy derivative of cellulose capable of being precipitated by an alkali but containing no alkali and no reducing agent, then developing the aniline black by shortly steaming the material, and thereupon fixing the vat dyestuff by treating the material in an alkaline bath containing a reducing agent, and subsequently steaming the material thus treated.

3. The process of producing vat dyestuff prints and closely adjacent thereto aniline black prints on the same fabric, which comprises printing the material in separate designs with a printing paste comprising an aniline black preparation, and with another printing paste comprising a vat dyestuff and as a thickening agent a cellulose ether capable of being precipitated by an alkali, but containing no alkali and no reducing agent, then developing the aniline black by shortly steaming the material, and thereupon fixing the vat dyestuff by treating the material in an alkaline bath containing a reducing agent, and subsequently steaming the material thus treated.

4. The process of producing vat dyestuff prints and closely adjacent thereto aniline black prints on the same fabric, which comprises printing the material in separate designs with a printing paste comprising an aniline black preparation, and with another printing paste comprising a vat dyestuff and methyl cellulose soluble in cold water and capable of being precipitated by an alkali, but containing no alkali and no reducing agent then developing the aniline black by shortly steaming the material, and thereupon fixing the vat dyestuff by treating the material in an alkaline bath containing hydrosulfite, and subsequently steaming the material thus treated without any intermediate drying.

ERNST PFEFFER.